Patented May 15, 1951

2,553,011

UNITED STATES PATENT OFFICE 2,553,011

MANUFACTURE OF DISAZO-DYESTUFFS CONTAINING COPPER IN COMPLEX UNION

Jack Arnold Schedler, Wilmslow, and Roy Whalley, Edenfield, England, assignors to The Clayton Aniline Company Limited, Manchester, England No Drawing. Application May 27, 1947, Serial No. 750,870. In Great Britain April 11, 1947

5 Claims. (Cl. 260—148)

This application is a continuation-in-part of United States patent application No. 682,148, filed July 8, 1946, now abandoned.

It is known to manufacture disazo-dyestuffs containing copper in complex union by coupling one molecular proportion of a tetrazotised aromatic diamine containing an alkoxy-group in ortho-position to each diazo-group in an alkaline medium with two molecular proportions of an amino-naphthol sulphonic acid or with one molecular proportion each of an aminonaphthol sulphonic acid and a naphthol sulphonic acid, and heating the resulting dyestuff with a solution which contains $Cu(NH_3)_4{}^{..}$ ions until the alkoxy groups have been split up. Solutions of this kind are obtained by mixing solutions which contain $Cu^{..}$ ions, such as solutions of cupric chloride, cupric sulphate, cupric nitrate, cupric acetate, etc. with an excess of ammonia. Instead of using solutions of cupric salts as starting materials, cupric hydroxide or freshly prepared cupric oxide may be dissolved in ammonia solution. In all these cases compounds are formed which in an aqueous medium furnish $Cu(NH_3)_4{}^{..}$ ions, that is to say, cupritetrammine ions. Instead of inorganic cupritetrammine compounds, organic cupritetrammine compounds may be used; these are formed in known manner by the reaction of a cupric salt or cupric hydroxide with an organic base such as methylamine, ethylamine, pyridine, piperidine or morpholine.

We have observed that in the above process, in the case of many aminonaphthol sulphonic acids, there is a tendency for the dyestuff molecule to be destroyed to a certain extent during the ammoniacal cupration, so that the isolated complex copper compound of the dyestuff may be contaminated in some degree by undesired by-products which affect the purity of colour of the dyeings obtained with the complex copper compound. In many cases, especially in the case of 1-amino-8-hydroxynaphthalene sulphonic acids of which the amino group is not protected by a sulpho group in 2-position, as in 1:8-aminonaphthol-3:6-disulphonic acid, it has been found impossible, even after repeated purification, to obtain the complex copper compound in a sufficiently pure state. In the case of 1:8-amino-naphthol-2:4-disulphonic acid, however, a reasonably pure complex copper compound is obtained. This acid is also known to differ from most other aminonaphthol sulphonic acids in that it cannot readily be acylated at the NH2 group.

According to the present invention disazo-dyestuffs containing copper in complex union are made by hydrolysing the acylamino groups of cupriferous dyestuffs which, in the free form, correspond to the formula

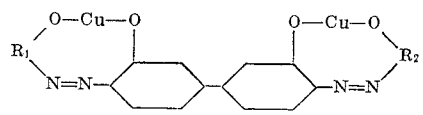

wherein $R_1$ stands for a naphthalene nucleus which in addition to an acylamino group contains at least one sulpho group, the —O—Cu—O-bridge being connected to one of the carbon atoms of a 1:2-position of the naphthalene nucleus and the —N=N-bridge to the other of such carbon atoms, and wherein $R_2$ stands for the radical of a coupling component in which the —O—Cu—O-bridge and the —N=N-bridge are linked to vicinal carbon atoms. The cupriferous dyestuffs required for this purpose are made by coupling one molecular proportion of a tetrazotised 3:3'-dialkoxy-4:4'-diaminodiphenyl in an alkaline medium with (a) two molecular proportions of an acylamino-naphthol mono- or di-sulphonic acid, or (b) one molecular proportion each of two different coupling components of the kind specified under (a), or (c) one molecular proportion of a coupling component specified under (a) and one molecular proportion of a coupling component of another kind containing a hydroxyl group and capable of coupling in ortho position with respect to the said group but being free from —NH2-groups, or (d) one molecular proportion of a coupling component of the kind specified under (a) and one molecular proportion of 1:8-aminonaphthol-2:4-disulphonic acid, heating the resulting disazo-dyestuff with a solution of one of the above described cupritetrammine compounds until the alkoxy-groups have been split up. The hydrolysis of the cupriferous disazo-dyestuffs so obtained is carried out by heating them in the presence of a dilute solution of a caustic alkali or of a strong mineral acid. In this manner it is possible to obtain dyestuffs which are in a purer state and dye textile materials in tints of greater purity than the copper compounds obtained by cuprating the dyestuffs made from the corresponding non-acylated aminonaphthol mono- or di-sulphonic acids.

There is advantageously used as the tetrazo-component 3:3'-dimethoxy-4:4'-diaminodiphenyl.

As acylamino-naphthol mono- or di-sulphonic acids there may be used the acylamino-derivatives of aliphatic or aromatic acids, such as formic acid, acetic acid, propionic acid, maleic acid, succinic acid, benzoic acid or pyridine-3-carboxylic acid. Such coupling components are, for example, N-acetyl-1:8-aminonaphthol-3:6-disulphonic acid, N-acetyl-1:8-aminonaphthol-4:6-disulphonic acid, N-acetyl-2:8-aminonaphthol-3:6-disulphonic acid, N-acetyl-2:5-aminonaphthol-7-sulphonic acid or N-acetyl-3:5-aminonaphthol-7-sulphonic acid; and also 1-benzoylamino-, 1-maleylamino-, 1-succinylamino- or 1-(3'-pyridinecarboxyl)-amino-8-hydroxynaphthalene-3:6-disulphonic acid. As acylaminonaphthol mono- or di-sulphonic acids there may also be used the corresponding carbamic acid ester derivatives (urethanes), for example, N-carbethoxy-1:8-aminonaphthol-3:6-disulphonic acid or N-carbethoxy-2:5-aminonaphthol-7-sulphonic acid; and it is to be understood that the term "acylamino" is used herein to include "carbalkoxyamino."

As coupling components containing a hydroxyl group and capable of coupling in ortho-position with respect to the said group, other than acylaminonaphthol mono- or di-sulphonic acids, there may be used hydroxy-compounds of the naphthalene series, such as naphthol mono- or di-sulphonic acids, for instance, 1:4-naphthol sulphonic acid, 1:5-naphthol sulphonic acid, 2:4-naphthol sulphonic acid, 1:3:6-naphthol disulphonic acid, 1:8-aminonaphthol-2:4-disulphonic acid or N-phenyl-2:5-aminonaphthol-7-sulphonic acid; hydroxy-compounds of the benzene series, for example, 1-hydroxy-3:4-dimethylbenzene or resorcinol; or pyrazolone compounds, for example, 1-(4'-sulphophenyl)-3-methyl-5-pyrazolone.

The cupriferous disazo-dyestuffs obtained in accordance with the invention dye textile materials in various tints which are fast to light. Especially valuable are the dyestuffs which produce blue dyeings and which contain at least once the radical of a 1:8-aminonaphthol-sulphonic acid, and among these dyestuffs principally those which are derived from 1:8-aminonaphthol-3:6-disulphonic acid. These dyestuffs are obtained by hydrolyzing the acylamino-groups of cupriferous dyestuffs which, in the free form, correspond to the general formula

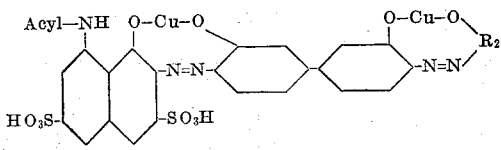

wherein $R_2$ stands for a naphthalene nucleus carrying at least one sulpho-group and having the —O—Cu—O—bridge connected to one of the carbon atoms of a 1:2-position and the —N=N—bridge to the other of such carbon atoms, and wherein the sum of the SO₃H-groups is at least 3 and not more than 5. Finally, there are also of special value asymmetrical dyestuffs of the above formula, in which the radical $R_2$ is not of the atomic configuration of 1:8-aminonaphthol-3:6-disulphonic acid, for example, those in which the grouping

represents an atom grouping such as

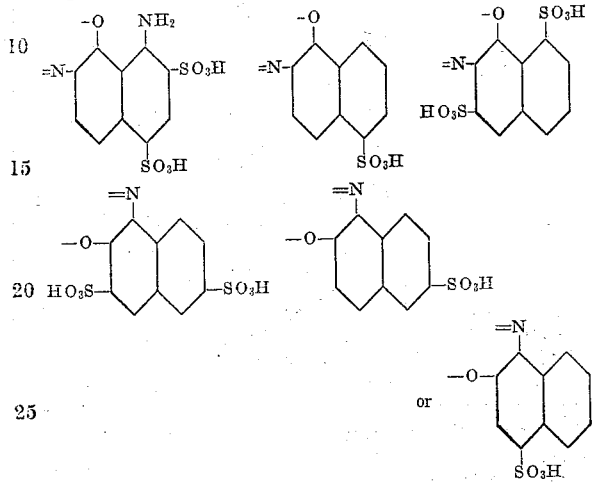

Among such products, special mention may be made of those in which the number of sulpho groups is equal to that of the auxochromic groups (NH₂ and OH groups) of the coupling components as in the case of 1:8-aminonaphthol-2:4-disulphonic acid, 1-hydroxynaphthalene-5-sulphonic acid or 2-hydroxynaphthalene-4- or -6-sulphonic acid.

The following examples illustrate the invention, the parts being by weight unless otherwise stated, and the relationship of parts by weight to parts by volume being the same as that of the kilogram to the litre.

*Example 1*

24.4 parts of 3:3'-dimethoxy-4:4'-diaminodiphenyl are tetrazotised and coupled with 75.8 parts of N-acetyl-1:8-aminonaphthol-3:6-disulphonic acid in a solution rendered alkaline with sodium carbonate. The isolated dyestuff is suspended in 3000 parts of hot water and 88 parts by volume of ammonia solution (specific gravity 0.88) are added followed by a solution of 60 parts of crystalline copper sulphate dissolved in 200 parts of water. The mass is stirred at a temperature of 80° C. in a reflux apparatus for 22 hours during which the reaction mass is maintained alkaline, if necessary, by further additions of ammonia solution. At the end of this period the complex copper compound is precipitated by the addition of little sodium chloride and isolated. The two N-acetyl groups are hydrolysed by heating the dyestuff with 1150 parts of dilute caustic soda solution of 3-4 per cent. strength for one hour at 95-100° C. After neutralising the excess of caustic soda with concentrated hydrochloric acid, the dyestuff is salted out with sodium chloride, filtered and dried. The complex copper compound thus obtained probably corresponds, in the free state, to the formula

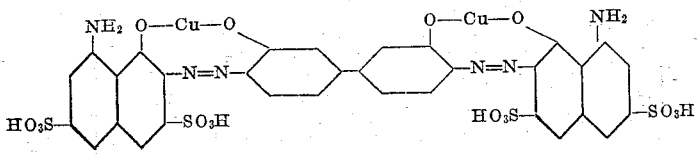

and is a dark powder, which is readily soluble in water to give a greenish blue solution, and dyes cotton from an alkaline bath bright green-blue tints of very good fastness to light. The dyestuff so obtained is considerably purer than the product of Example 9 of French Patent No. 888,249. Thus, if solutions of 0.15 per cent. strength of these two dyestuffs rendered alkaline with sodium carbonate or caustic soda are tested by dipping a strip of blotting paper in them (capillary analysis), the product of the present example is distinguished by exhibiting a much smaller amount of grey dyeing impurities.

The same dyestuff is obtained by conducting the hydrolysis with a dilute mineral acid solution of 3–4 per cent. strength for 2 hours at 95–100° C.

The same dyestuff is also obtained by using in this example N-carbethoxy-1:8-aminonaphthol-3:6-disulphonic acid, instead of N-acetyl-1:8-aminonaphthol-3:6-disulphonic acid, the procedure being otherwise the same as that described above.

In a similar manner other acylaminonaphthol-mono- or di-sulphonic acids may be used, for instance, N-acetyl-2:8-aminonaphthol-3:6-disulphonic acid, N-acetyl-2:5-aminonaphthol-7-sulphonic acid or N-acetyl-3:5-aminonaphthol-7-sulphonic acid. The dyestuffs obtained from the three latter coupling components dye cotton from a bath rendered alkaline with sodium carbonate in tints which are greyish blue, reddish blue and blackish blue respectively.

Example 2

24.4 parts of 3:3-dimethoxy-4:4′-diaminodiphenyl are tetrazotised in the usual manner. A cold, concentrated solution of sodium carbonate is then added until the reaction is faintly alkaline to Brilliant Yellow paper. A solution of the sodium salt of 37 parts of N-acetyl-1:8-aminonaphthol-3:6-disulphonic acid is then added immediately. When no more tetrazo-compound can be detected, usually after 5–10 minutes, a solution of 23.5 parts of the sodium salt of 1:4-naphthol sulphonic acid is added. The isolated dyestuff is suspended in 2000 parts of hot water and 75 parts by volume of ammonia solution (specific gravity 0.88) are added followed by a solution of 51 parts of crystalline copper sulphate dissolved in 170 parts of water. The whole is stirred at a temperature of 80° C. in a reflux apparatus for 20–22 hours, the reaction being maintained alkaline with ammonia throughout. The complex copper compound is precipitated by acidification with hydrochloric acid, and separated by filtration. The N-acetyl group of the dyestuff is hydrolysed by heating with 1250 parts of caustic soda solution of 3–4 per cent. strength for 1–1½ hours to 90–95° C. After neutralizing the excess of caustic soda with concentrated hydrochloric acid, the dyestuff is salted out with sodium chloride. The complex copper compound which, in the free state, very probably corresponds to the formula

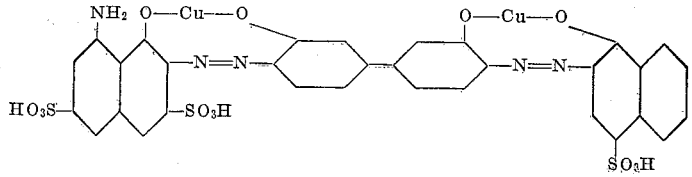

is readily soluble in water to give a blue solution. It dyes cotton from an alkaline bath bright reddish blue tints of very good fastness to light.

By using in this example N-phenyl-2:5-aminonaphthol-7-sulphonic acid, instead of 1:4-naphthol sulphonic acid, a dyestuff giving a still redder shade of blue is obtained. When 1:3:6-naphthol disulphonic acid is used as second component a dyestuff giving distinctly greener shades is obtained. By using, in this example, instead of 1:4-naphthol sulphonic acid, 1-(4′-sulphophenyl)-3-methyl-5-pyrazolone or resorcinol two dyestuffs are obtained which, in the free state, very probably correspond to the formulae

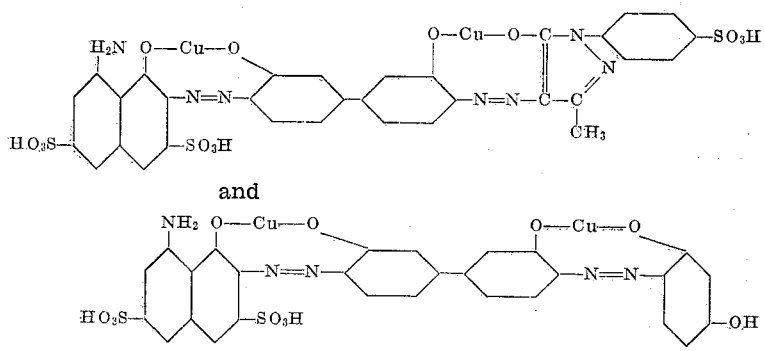

and which dye cotton from a bath rendered alkaline with sodium carbonate in tints which are dark blue and blue respectively. All these dyestuffs produce dyeings of excellent fastness to light.

Example 3

24.4 parts of 3:3′-dimethoxy-4:4′-diaminodiphenyl are tetrazotised, and coupled with the sodium salt of 37 parts of N-acetyl-1:8-aminonaphthol-3:6-disulphonic acid as described in Example 2. A solution of the sodium salt of 33.6 parts of 1:8-aminonaphthol-2:4-disulphonic acid is added. The isolated dyestuff is suspended in 2300 parts of hot water and 88 parts by volume of ammonia solution (specific gravity 0.88) are added followed by a solution of 60 parts of crystalline copper sulphate dissolved in 200 parts of water. The whole is stirred at a temperature of 80° C. in a reflux apparatus for 20–22 hours, the reaction being maintained alkaline with ammonia throughout. The complex copper compound is isolated by acidification with hydrochloric or sulphuric acid, salted out with 600 parts of sodium chloride, and separated by filtration. The N-acetyl group of the dyestuff is hydrolysed by heating with 1100 parts of caustic soda solution of 3-4 per cent. strength for 1-1½ hours at 90-95° C. After making faintly acid to Congo with hydrochloric or sulphuric acid, the dyestuff is filtered off. The complex copper compound is readily soluble in water to give a greenish blue solution. It dyes cotton from an alkaline bath bright green-blue tints of very good fastness to light. The complex copper compound so obtained very probably corresponds, in the free state, to the formula

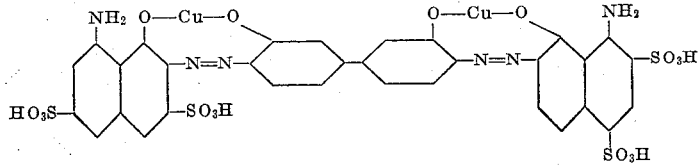

In this case also the copper compound is considerably purer than the corresponding product obtained by following the procedure described in French Patent No. 780,293. Thus, if solutions of 0.15 per cent. strength of these two products rendered alkaline with sodium carbonate or caustic soda are tested by dipping a strip of blotting paper in them (capillary analysis), the product of the present example is distinguished by exhibiting a very considerably smaller amount of grey dyeing impurities.

The same dyestuff is obtained by conducting the hydrolysis with dilute mineral acid solution of 3-4 per cent. strength for about 1 hour at 95-100° C.

*Example 4*

24.4 parts of 3:3'-dimethoxy-4:4'-diaminodiphenyl are tetrazotised, and coupled with the sodium salt of 37 parts of N-acetyl-1:8-aminonaphthol-3:6-disulphonic acid as described in Example 2. A solution of the sodium salt of 23.5 parts of 2:4-naphthol sulphonic acid is then added. The dyestuff is isolated by salting out, suspended in 2200 parts of hot water, and 88 parts of ammonia solution (specific gravity 0.88) are added followed by a solution of 60 parts crystalline copper sulphate dissolved in 200 parts of water. The whole is stirred at a temperature of 80° C. in a reflux apparatus for 20-22 hours, the reaction being maintained alkaline throughout. The complex copper compound is isolated by salting out with sodium chloride. The N-acetyl group of the dyestuff is hydrolysed by heating with 1650 parts of caustic soda solution of 3-4 per cent. strength for 1-1½ hours to 90-95° C. After salting out with 400 parts of sodium chloride, the excess of caustic soda is neutralised with hydrochloric or sulphuric acid, and the dyestuff is filtered off. The complex copper compound is readily soluble in water to give a blue solution. It dyes cotton from an alkaline bath bright blue tints of very good fastness to light. The complex copper compound, in the free state, very probably corresponds to the formula:

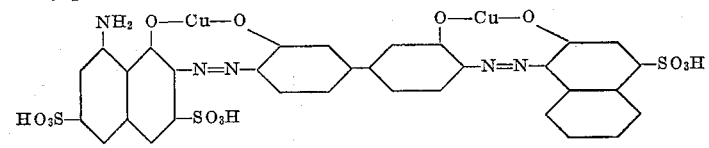

*Example 5*

The asymmetrical azo-dyestuff, which is obtainable by coupling the tetrazo-compound from 24.4 parts of 3:3'-dimethoxy-4:4'-diaminodiphenyl with 36 parts of 1-acetylamino-8-hy-droxynaphthalene-3:6-disulphonic acid and then with 22.4 parts of 1-hydroxynaphthalene-4-sulphonic acid, is suspended in 2000 parts of hot water and 75 parts by volume of ammonia solution, and a solution of 35 parts of crystalline cupric chloride ($CuCl_2 2H_2O$) in 100 parts of water is added. The reaction mass is then heated to 80° C. for 24 hours in a reflux apparatus. It is then cooled and the complex copper compound which has formed is precipitated by neutralization with hydrochloric acid and filtered. The residue is introduced into 1250 parts of a sodium hydroxide solution of 3-4 per cent strength and heated to 90° C. for 60-90 minutes. The excess of caustic alkali is then neutralized with hydrochloric acid, the dyestuff is precipitated with sodium chloride, and then filtered. The dyestuff thus obtained is the same as that of the first paragraph of Example 2. The same dyestuff is obtained if the hydrolysis is performed with hydrochloric acid of 4 per cent strength.

Quite similar results are obtained when the cupric chloride is replaced by cupric acetate or cupric nitrate, or when cupric hydroxide or cupric oxide is first prepared by causing sodium hydroxide to act on cupric chloride, and the cupric hydroxide or cupric oxide is then dissolved in ammonia solution. Instead of ammonia, monomethylamine or monoethylamine may be used.

*Example 6*

109.5 parts of the sodium salt of the asymmetrical dyestuff, obtained by coupling 1 mol of tetrazotised 3:3'-dimethoxy-4:4'-diaminodiphenyl with 1 mol of 1-benzoylamino-8-hydroxynaphthalene-3:6-disulphonic acid and 1 mol of 1:8-amino-hydroxynaphthalene-2:4-disulphonic acid, are dissolved in 3000 parts of water, mixed with an ammoniacal copper nitrate solution consisting of 48.5 parts of $Cu(NO_3)_2 3H_2O$, 13.6 parts by volume of $NH_3$ and 150 parts of water, and heated to 80-90° C. for 20 hours. The sparingly soluble complex copper compound is then separated by filtering with suction, dispersed in 1500 parts of caustic soda solution of 4 per cent strength and heated to 95° C. for one hour, during which operation the benzoyl group is split off and complete dissolution occurs. The dyestuff is precipitated by the addition of hydrochloric acid and sodium chloride, then filtered and dried. The complex copper compound so obtained, which corresponds to the compound of the first paragraph of Example 3, dyes cotton green-blue tints.

*Example 7*

111 parts of the sodium salt of the asymmetrical dyestuff, which is prepared by coupling 1 mol of tetrazotised 3:3'-dimethoxy-4:4'-diamino-diphenyl with 1 mol of 1-maleylamino-8-hydroxynaphthalene-3:6-disulphonic acid and 1 mol of 1:8-amino-hydroxynaphthalene-2:4-disulphonic acid, are dissolved in 3000 parts of water and, after admixture with 200 parts of an ammoniacal copper acetate solution (36 parts of $$Cu[C_2H_3O_2]_2 + H_2O$$

and 13.6 parts by volume of $NH_3$), heated to 80–90° C. for 16 hours. The complex copper compound is then precipitated by neutralization with hydrochloric acid and the addition of sodium chloride, separated by filtration, dissolved in 1500 parts of caustic soda solution of 4 per cent strength, and heated to 80–90° C. for 1 hour in order to split off the maleyl radical. The dyestuff, which corresponds to the formula given in Example 3, is isolated in the usual manner. After drying, it is a dark powder which dyes cotton green-blue tints.

*Example 8*

110 parts of the sodium salt of the asymmetrical dyestuff, obtained from 1 mol of tetrazotised 3:3'-dimethoxy-4:4'-diamino-diphenyl, 1 mol of 1 - (3' - pyridine - carboyl) - amino - 8 - hydroxynaphthalene - 3:6 - disulphonic acid (obtained by the action of 1 mol of pyridine-3-carboxylic acid chloride on 1 mol of 1-amino-8-hydroxynaphthalene - 3:6 - disulphonic acid) and then 1 mol of 1-amino-8-hydroxynaphthalene-2:4-disulphonic acid, are dissolved in 3000 parts of water with the addition of 200 parts of pyridine. This solution is dissolved with 35 parts of crystalline cupric chloride ($CuCl_2 2H_2O$) in 60 parts by volume of ammonia solution (specific gravity 0.91), and mixed with 150 parts of water, and then heated to 80–90° C. for 16 hours. When the whole has cooled, the precipitated sparingly soluble complex copper compound is filtered off, and, in order to split off the pyridine carboxylic acid radical, heated to 95–100° C. for 6–8 hours with 2000 parts of caustic soda solution of 4 per cent strength. The mass is then neutralized with concentrated hydrochloric acid and the dyestuff, which corresponds to the formula given in Example 3, is precipitated by the addition of sodium chloride, filtered and dried. It dyes cotton greenish blue tints.

*Example 9*

A dyebath is prepared with 1 part of the dyestuff obtainable as described in Example 6, 2 parts of sodium carbonate and 2500 parts of water. 100 parts of cotton are entered at 60° C., and the bath is heated to 90–95° C. After ¼ hour 30 grams of crystalline sodium sulphate are added, and the whole is boiled for a further ½ hour. The cotton is dyed green-blue.

We claim:

1. In a process for the manufacture of a disazo dyestuff containing copper in complex union, the molecule of which dyestuff tends to deteriorate during ammoniacal cupration, the step of subjecting a cupriferous dyestuff which, in the free form, corresponds to the formula

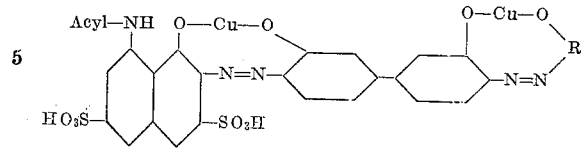

wherein $R_2$ stands for a naphthalene nucleus carrying at least one sulpho group and having the —O—Cu—O—bridge connected to one of the carbon atoms of a 1:2-position and the —N=N— bridge to the other of such carbon atoms, and wherein the sum of the sulpho groups is at least 3 and at the most 4, to the action of a hydrolyzing agent selected from the group consisting of dilute alkali solution and dilute mineral acid solution, whereby acylamino contained in the said cupriferous dyestuff is hydrolysed to free amino.

2. In a process for the manufacture of a disazo dyestuff containing copper in complex union, the molecule of which dyestuff tends to deteriorate during ammoniacal cupration, the step of subjecting a cupriferous dyestuff which, in the free form, corresponds to the formula

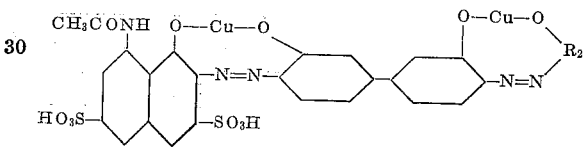

wherein $R_2$ stands for a naphthalene nucleus carrying at least one sulpho group and having the —O—Cu—O—bridge connected to one of the carbon atoms of a 1:2-position and the —N=N— bridge to the other of such carbon atoms, and wherein the sum of the sulpho groups is at least 3 and at the most 4, to the action of dilute alkali hydroxide solution, whereby acylamino contained in the said cupriferous dyestuff is hydrolysed to free amino.

3. In a process for the manufacture of a disazo dyestuff containing copper in complex union, the molecule of which dyestuff tends to deteriorate during ammoniacal cupration, the step of subjecting a cupriferous dyestuff which, in the free form, corresponds to the formula

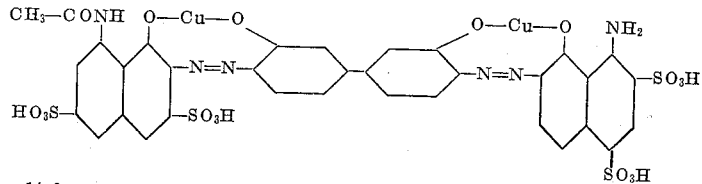

to the action of a dilute alkali hydroxide solution, whereby the acetylamino group in the said cupriferous dyestuff is hydrolysed to free amino.

4. In a process for the manufacture of a disazo dyestuff containing copper in complex union, the molecule of which dyestuff tends to deteriorate during ammoniacal cupration, the step of subjecting a cupriferous dyestuff which, in the free form, corresponds to the formula

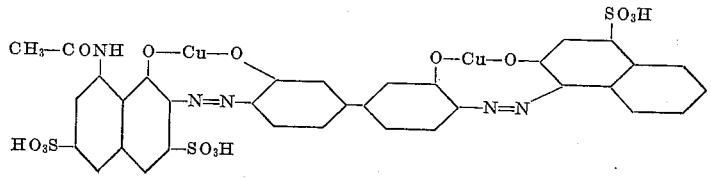

to the action of a dilute alkali hydroxide solution, whereby the acetylamino group in the said cupriferous dyestuff is hydrolysed to free amino.

5. In a process for the manufacture of a disazo dyestuff containing copper in complex union, the molecule of which dyestuff tends to deteriorate during ammoniacal cupration, the step of subjecting a cupriferous dyestuff which, in the free form, corresponds to the formula

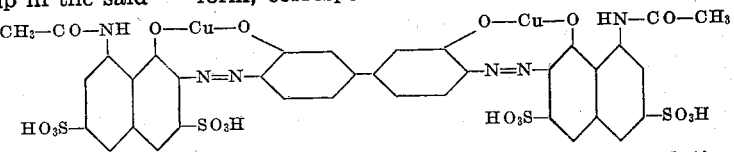

to the action of a dilute alkali hydroxide solution, whereby the acetylamino groups in the said cupriferous dyestuff are hydrolysed to free amino.

JACK ARNOLD SCHEDLER.
ROY WHALLEY.

REFERENCES CITED

The following references are of record in the file of this patent:

UNITED STATES PATENTS

| Number | Name | Date |
| --- | --- | --- |
| 1,767,379 | Krzikalla et al. | June 24, 1930 |
| 1,849,572 | Gyr | Mar. 15, 1932 |
| 1,849,573 | Gyr | Mar. 15, 1932 |
| 1,889,732 | Stusser | Nov. 29, 1932 |
| 1,921,336 | Wiedemann et al. | Aug. 8, 1933 |
| 1,940,066 | Stusser | Dec. 19, 1933 |
| 2,036,159 | Mendoza | Mar. 31, 1936 |
| 2,243,020 | Straub et al. | May 20, 1941 |
| 2,400,092 | Anderson | May 14, 1946 |

FOREIGN PATENTS

| Number | Country | Date |
| --- | --- | --- |
| 780,293 | France | Jan. 29, 1935 |